United States Patent [19]

Berthold

[11] Patent Number: 5,347,130
[45] Date of Patent: Sep. 13, 1994

[54] METHOD AND DEVICE FOR MEASURING THE DISTRIBUTION OF RADIOACTIVITY ON A FLAT SAMPLE

[75] Inventor: Fritz Berthold, Pforzheim, Fed. Rep. of Germany

[73] Assignee: Laboratorium Prof. Dr. Rudolf Berthold GmbH & Co., KG, Wildbad, Fed. Rep. of Germany

[21] Appl. No.: 981,391

[22] Filed: Nov. 25, 1992

[30] Foreign Application Priority Data

Nov. 29, 1991 [DE] Fed. Rep. of Germany ....... 4139368

[51] Int. Cl.$^5$ .............................................. G01T 1/185
[52] U.S. Cl. .................... 250/385.1; 250/374
[58] Field of Search ...................... 250/385.1, 374, 375; 378/2, 146

[56] References Cited

U.S. PATENT DOCUMENTS 3,860,821 1/1975 Barrett .
4,965,861 10/1990 Filthuth .

FOREIGN PATENT DOCUMENTS 0112645 7/1987 European Pat. Off. .
3002950 1/1980 Fed. Rep. of Germany .
3050716 1/1980 Fed. Rep. of Germany .
3516801 5/1985 Fed. Rep. of Germany .
3915613 5/1989 Fed. Rep. of Germany .
3744808 10/1989 Fed. Rep. of Germany .

OTHER PUBLICATIONS

Radiochromatography—The Chromatography and Electrophoresis of Radiolabelled Compounds; T. R. Roberts, Journal of Chromatography Library—vol. 14, 1978.

Primary Examiner—Paul M. Dzierzynski
Assistant Examiner—Richard Hanig
Attorney, Agent, or Firm—Spensley Horn Jubas & Lubitz

[57] ABSTRACT

A method and device for effecting a location-sensitive measurement of a flat sample of radiation emitting material having a plurality of partial areas, in which a screen plate having radiation passage openings is disposed between a detector and the sample; radiation emanating from a group of the partial areas is detected in accordance with the shape of the screen plate openings; information based on the detected radiation is stored; and then a relative displacement is effected between the sample and the detector and detecting and storing are repeated for another group of partial areas, so that the total measurement is composed of a plurality of such successively performed partial measurements which provide a measurement of the total distribution of radiation emitted by the sample. The screen plate is provided with a plurality of slits which constitute the passage openings and which extend in parallel with one another essentially across the entire width of the screen plate; each detecting operation involves a substantially simultaneous, location-sensitive measurement of strip-like partial areas of the sample which are in line with the slits; and said each relative displacement is effected between a detection operations exclusively in a direction transverse to the direction in which the slits extend.

18 Claims, 7 Drawing Sheets

METHOD AND DEVICE FOR MEASURING THE DISTRIBUTION OF RADIOACTIVITY ON A FLAT SAMPLE

FIELD OF THE INVENTION

The present invention relates to a method for location-sensitive measuring of a flat sample with a screen plate disposed between a detector and the sample, in which, in each one of a number of method steps, the radiation of a group of partial areas of the sample is detected in accordance with the shape of the screen openings and is stored, after which a relative displacement between the samples and the detector is performed in order to detect the radiation from another group of partial areas, so that the total measurement is constituted by a plurality of such successively performed partial measurements which together identify the total distribution of radioactivity. The invention also relates to a device for executing the method.

BACKGROUND OF THE INVENTION

A method of the type to which the present invention is directed is disclosed in European Patent Disclosure EP 0 112 645 B1. The device disclosed therein for performing a method of the type here under consideration includes an electronic evaluation unit with a memory member and a display member for the measured intensity distribution Z of the radiation, where a screen plate with a plurality of evenly spaced screen openings is provided between the detector and the sample.

The detector provided therein is described as consisting of an ionization chamber. A decoding circuit is indicated to be preferably provided for evaluation, which permits the identification of that intersection point or assigned screen opening beneath which radiation was detected.

However, ionization chambers are not usable for detecting weak radioactive radiation (T. R. Roberts, "Radiochromatography" in Journal of Chromatography Library, Vol. 14, Elsevier Scientific Publishing Co., 1978), so that the practical application of such a location-sensitive operating measuring system is limited.

In a device of the type here under consideration, an intersection point between counting wires which extend in x- and y-directions is associated with each screen opening in wire levels disposed on top of each other in the ionization chamber where, by means of the above mentioned decoding of tile information received, the counting rate of the partial area of the sample associated with this screen opening can be detected or measured. Thus, the known device operates as an m·n-multi-counter (corresponding to m·n-counting wire intersection points) which, as a function of the shape of the screen opening, scans in a meandering fashion over the sample surface to be measured and in the course of which detects m·n image points during each partial measurement (FIG. 1b of EP 0 112 645).

The local resolution in the x-plane as well as in the y-plane which can be obtained with this operating principle (matrix-like disposition of screen openings and meander-like scanning movements) is achieved here by the size of the screen openings in the coordinate direction. If a very high local resolution is required, such as with 32-P-marked DNS sequence gels and blots, where resolutions on the order of 0.3 mm are desirable as typical values, a very large number of screen openings is needed, with correspondingly expensive decoding circuitry and a plurality of evaluation wires, or a correspondingly higher number of partial measurements with a very slow and structurally expensive scanning movement and a very long measuring time resulting therefrom.

With special applications, such as the already mentioned measurement of DNS sequence gels or blots, measurements which are only location-sensitive in one direction (one-dimensional) are sufficient.

For this special case, a device of the type under consideration can be provided with slit-shaped screen openings, the width (x-direction) of which corresponds approximately to the width of the bands of a DNS sequence gel to be measured. By means of the still required one-dimensional scanning movement it is then possible, for example, to detect samples in the form of adjoining bands simultaneously through a scanning movement in the direction of the bands (column 12, line 64, to column 13, line 5, of EP 0 122 645 and FIG. 1 thereof).

The simultaneous detection of bands which adjoin perpendicularly to the scanning direction, however, can no longer be considered to represent a location-sensitive measurement in that direction. A "location resolution", which in this case is at best fictional, of such a measurement has a value which is inferior to the length of the slits in the x-direction, which results in coarse averaging of the radioactivity distribution above the slit.

The performance price which has to be paid by such a device for simplified linear scanning, therefore, is necessarily the loss of location sensitivity in the direction perpendicular to the scanning direction, so that with this kind of operation such device can no longer be used for two-dimensionally sensitive measurement. Because of this, detailed structures, such as arc-shaped radioactivity patterns which for example occur in DNS sequence gels, are necessarily lost.

Furthermore, such limitation to a one-dimensional scanning movement is only justifiable if the focus of the bands to be measured does not vary in the x-direction. In actuality, the two effects mentioned (arc-shaped radioactivity pattern with temporal offset) occur quite often together. In such cases it would not even be possible to perform a meaningful association of the measured mean values to the respective bands, and the measurement would be unusable. Finally the device, reduced by using the slit screen with a one-dimensionally location-sensitive operating device (and therefore no longer in accordance with the type of device under consideration), is therefore only usable in special exceptional cases (ideal extent of the bands).

Another known type of device for the two-dimensional measurement of radioactive radiation includes multi-wire proportional counters, such as described in German Published, Non-Examined Patent Application DE-OS 37 35 296 and counterpart U.S. Pat. No. 4,965,861. A proportional counting tube of this type which operates in a location-sensitive manner has three parallel wire levels, namely an anode wire level and two readout levels (the latter designated $D_x$ and $D_y$). As a rule, one readout level is located above the anode level, the other below it.

The wires of the readout levels can supply pulses induced therein to delay lines, namely one for the x-plane and one for the y-plane. Each supplied pulse moves from the place of introduction towards both ends of the delay line. Rapid response amplifiers are located at the ends of the delay line and the time difference between the arrival of each of the pulses at the two ends is measured. By the provision of an additional constant delay at one side of the delay line, the time period to be analyzed is made to lie between zero and twice the total delay of the delay line. This time period can be directly digitized by a time digital converter (TDC), or it is first changed into an analog value and then digitized by means of a pulse analog digital converter (ADC).

It is possible to realize a local resolution of approximately 0.5 mm (with a perpendicular light incidence as the ideal state) with such a two-dimensional proportional counter. However, this can be limited because of various nonlinearities and distortions in the electronic components. This hardware-created lower resolution limit can also be called the "inner resolution". In actuality, values for the local resolution of approximately 1 to 2 mm are the result of the mentioned non-linearities and the, as a rule isotropic, emission of the radiation from the sample. Collimators of different types are known for increasing the local sensitivity. For example, German Letters Patent No. 39 15 613 uses a screen with a plurality of screen bores, with the aid of which it is possible to achieve a local resolution in the range of approximately 1 mm with isotropic radiation incidence. To go below this value is essentially a matter of the technological limits in controlling the screen bore diameters. With a bore diameter of 0.5 mm in accordance with the above mentioned patent, in case of a specimen plate of $20 \times 20$ cm the result is already 80,000 bores in a collimator plate of this type.

Thus, the situation is that the two-dimensional, location sensitive measurement of flat samples by means of the known, two- dimensionally operating proportional counting tubes (even with the aid of collimators) is possible only with limited local resolution; and with the device under consideration only with an extreme effort in respect to apparatus and/or time.

SUMMARY OF THE INVENTION

It is therefore an object of the present invention to provide a device of the type for location-sensitive measurements in such a way that a local resolution can be achieved by means of which a satisfactory two-dimensional representation of the radioactive distribution of samples, in particular DNS sequence gels and blots, becomes possible in a short time.

The above and other objects are attained in accordance with the invention by a method and device for effecting a location-sensitive measurement of a flat sample of radiation emitting material having a plurality of partial areas, in which a screen plate having radiation passage openings is disposed between a detector and the sample; radiation emanating from a group of the partial areas is detected in accordance with the shape of the screen plate openings; information based on the detected radiation is stored; and then a relative displacement is effected between the sample and the detector and detecting and storing are repeated for another group of partial areas, so that the total measurement is composed of a plurality of such successively performed partial measurements which provide a measurement of the total distribution of radiation emitted by the sample. The screen plate is provided with a plurality of slits which constitute the passage openings and which extend in parallel with one another essentially across the entire width of the screen plate; each detecting operation involves a substantially simultaneous, location-sensitive measurement of strip-like partial areas of the sample which are in line with the slits; and said each relative displacement is effected between a detection operations exclusively in a direction transverse to the direction in which the slits extend.

In the device of the invention for executing this method, the measuring system is embodied in such a way that in the x- direction of the sample the radiation passing through the slits can be detected in a location-sensitive manner, and that devices are provided which during each scanning step displace the sample plate and the measuring system in relation to each other at most by the amount of the width of the slit either in steps or continuously.

A basic concept of the invention thus consists in combining the principles of location-dependent measurement path, collimation and scanning technology in a particularly advantageous manner. It is of decisive importance that the collimator has continuous slits, because here it is possible to reduce the slit width, which determines the local resolution in the y-direction, easily to the desired resolution range of 0.2 . . . 0.3 mm, something that is not easily achieved with collimator plates with screen bores, as already mentioned. The length of the slits in the x-direction is used for "conventional" location-sensitive measurements where, for example with the use of a two-dimensionally location-dependent proportional counting tube, it is possible to obtain resolutions in the range of 1 to 2 mm, which in the x-direction are enough for a sufficiently "sharp image" of the representation of the radioactivity distribution, particularly for detecting radioactivity distributions and structures which do not extend exactly parallel to the longitudinal direction of the slits. For this reason, the slit screen of the invention imbues the measuring system used with the specific function of a scanner in the direction of movement (y-direction), while the function or local resolution of the measuring system used remains unaffected in the direction of the slits. The local resolution in the scanning direction is determined by the slit width, which in particular may also lie below the "inner resolution" of the counting tube. Because of this functional assignment, the "scanning collimator" of the invention permits the adaptation of the device to the specific preferred direction of the specimen in the sense that a considerable increase of the location sensitivity is attained in the direction demanded by the specimen, without it being necessary in the other direction to do without the local resolution in that direction of the particular measuring system used.

The method of the invention can be executed with differently designed two-dimensionally operating measuring systems, preferably with a two-dimensionally operating location- dependent proportional counter. Basically, an arrangement of a number of one-dimensional counting tubes which are location-dependent and correspond to the number of slits could be sufficient, such as the one designed in accordance with German Letters Patent No. 30 02 950.

In the first case (two-dimensional location-dependent proportional counting tube), the attainment of the object in accordance with the invention permits a number of simplifications in the structure of the counting tube. Extremely close mechanical tolerances are no longer required, the number of anode and readout wires can be reduced, the mechanical and electronic demands made on the delay line associated with the y-plane can be reduced and the downstream-connected electronic logical processing device can be simplified.

The principle of the invention can basically also be represented in that, because of the use of the slit screen, the location dependence of the two-dimensional proportional counting tube in the y-direction is only used to measure simultaneously n (number of the slits) one-dimensional location distributions in the x-direction. In this case an essential difference in respect to the known device becomes clear, namely the possibility to sense a sample plate with extreme precision during only one one-dimensional "scanning pass". The known device would need to move through an x-y-scanning grid for this, which would be considerably more expensive and would use up more time.

Advantageous embodiments of the invention will be described below, particularly the provision of steps for assuring maximum sensitivity by as complete a detection and electronic evaluation as possible of the radiation passing through a slit of the slit screen, as well as by further adaptation to the structures of the specimens to be measured by "custom made" local resolution in the respective evaluation range of the specimen, namely widening the slits in those places where less local resolution is required and thus achieving an increased counting result. Here, too, optimum adaptation of the evaluation in respect to local resolution on the one hand and counting results on the other to the specific structures of the specimens to be measured can also be achieved. By means of the parallel slit screen it is possible to assign the exact location sensitivity to each direction or each surface area of the specimen to be measured which is required for evaluation with a desired precision and for constructing an image of the radioactivity distribution.

A number of exemplary embodiments will be described in detail with reference to the drawings.

DESCRIPTION OF THE PREFERRED EMBODIMENTS

Figure 1:
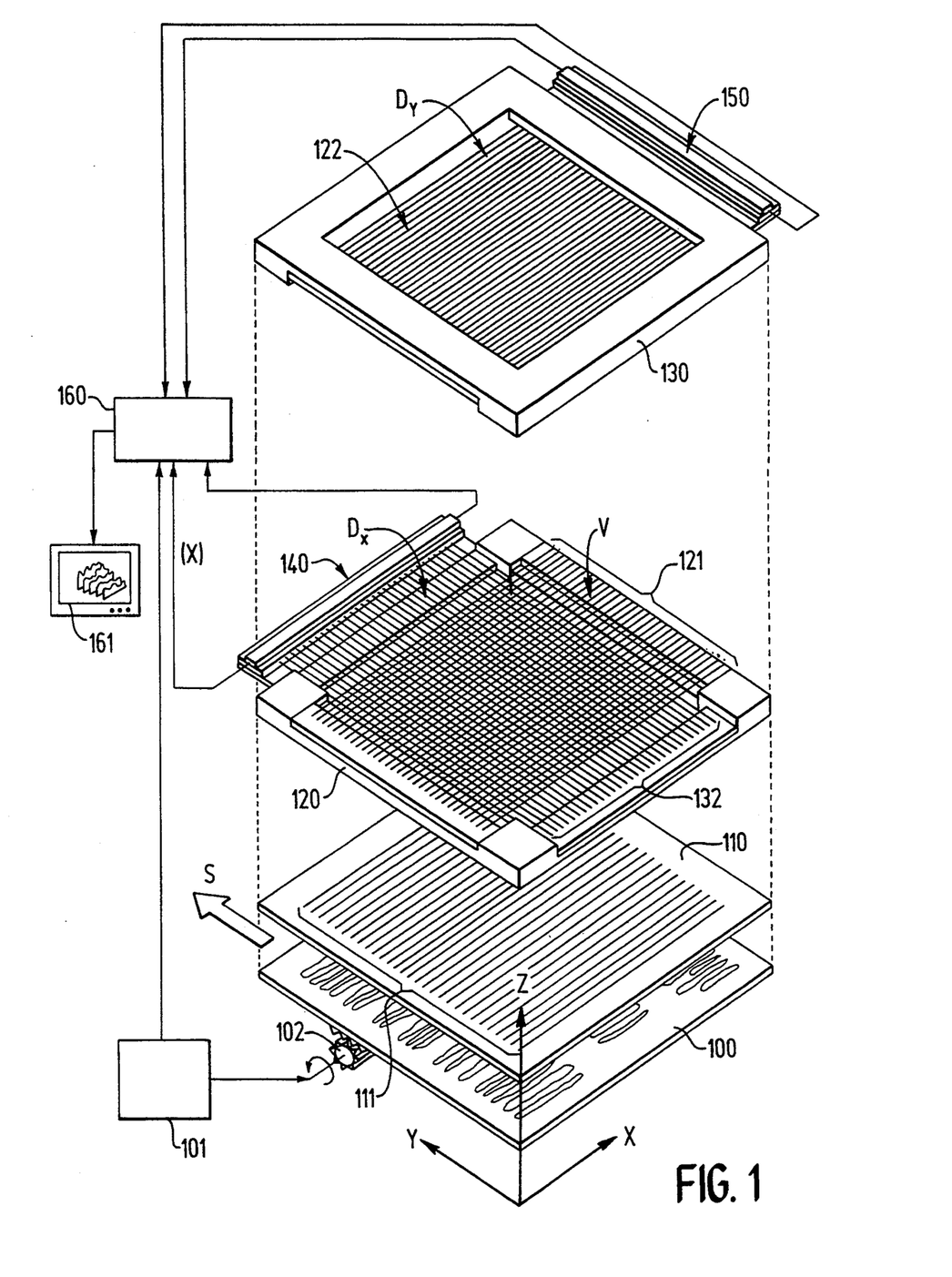
FIG. 1 is an exploded perspective view of a device in accordance with the invention with a location-sensitive two- dimensional proportional counting tube with $D_x$ and $D_y$ evaluation as the measuring system.

FIG. 1 shows a first exemplary embodiment of a device according to the invention in which a location-sensitive, two-dimensional proportional counting tube is employed, as is described by way of example in detail in respect to its structure and its function in DE 37 35 296 A1. Therefore only the essential components are shown in the drawings.

The specimen to be measured is on a sample plate 100 which can be displaced in the y-direction (arrow S) by a set scanning distance. This displaceability is schematically indicated by a drive unit 102, consisting of a toothed wheel which is in engagement with a rack, or teeth fastened to the underside of the sample plate 100. A drive control unit 101 is used for activating a stepped or continuous scanning movement. Drive control unit 101 in turn supplies information regarding the present scanning position of the sample plate 100 to an evaluation unit 160, where that information is correlated with the measured data.

Disposed above sample plate 100A is a parallel slit screen 110 in which a number of slits 111 have been cut in the x-direction, i.e. perpendicular to the scanning direction S. Displacement of the sample plate 100 underneath the parallel slit screen 110 thus allows the measuring system located above the parallel slit screen 110 to "see" slit-shaped sections of the sample plate 100 or of the radioactivity distribution present thereon.

In the exemplary embodiment shown in FIG. 1, the measuring system consists of a first frame 120 in which are fastened the wires 132 of the lower readout plane $D_x$ extending in the y-direction. These wires are connected with a first delay line 140 and are used to obtain the x-location information, i.e. for measuring the radioactivity distribution in the longitudinal direction of slits 111 of parallel slit screen 110. The wires 121 of an anode wire grid V are stretched above and perpendicular to wires 132. Wires 121 lie in a plane parallel to the lower readout plane $D_x$.

Above this first frame there is a second frame 130 which is used to define the second upper readout plane $D_y$ and consists of parallel extending cathode wires 122, which lie in the second upper readout plane $D_y$ and are connected to the second delay line 150. The y-location information is obtained with the aid of wires 122 and delay line 150, i.e. the number of the slit 111 through which a radiation particle passed and was registered is identified.

The location information (x) and (y) obtained from the two delay lines 140, 150 is linked in the evaluation unit 160 in such a way that from this information the number of the slit and the x-position of the radiation event in this particular slit can be obtained. With the linking of this location information with the information provided by drive control unit 101 (position of plate 100), the information is then complete to the extent that the location of a radiation event on the sample plate 100 is identified. This information is stored and forms an "image point". From the totality of such pieces of information it is then possible to obtain successively a histogram of the radioactivity distribution on the sample plate 100, for example, as is shown pictorially in FIG. 6 and as is produced on the display 161 which shows the information generated by the evaluation unit visually.

To explain the particularities in connection with the evaluation of the invention, the working principle of the two- dimensionally location-sensitive proportional counting tube will be briefly described (details thereof can be taken from the already mentioned DE 37 35 296 A1):

Counting pulses induced in the wires of the readout planes $D_x$ and $D_y$ are introduced into the delay lines 140, 150, where each pulse moves from the place of introduction into the delay line towards both ends of this delay line. Rapid response amplifiers are connected to both ends (in the evaluation unit 160) and the time difference between the arrival of each of the pulses from both ends of the delay line is measured. It is achieved by means of an additional constant delay (not shown) at one side of the delay line that the time period to be analyzed lies between zero and twice the total delay of the delay line, for example 0 to 800 ns. This time period can be directly digitized by a time-to-time digital converter (TDC), or it is first converted into an analog value and then digitized by means of a pulse analog-to-digital converter (ADC).

With a measuring system for a 20×20 cm measuring surface (sample plate 100), approximately 1000 channels of the ADC or TDC in the x- and y-direction are sufficient. In this case each channel corresponds linearly to 0.2 mm and thus $10^6$ image points (pixels) each with an effective area of 0.04 mm$^2$ are obtained for the entire surface.

Figure 6A:
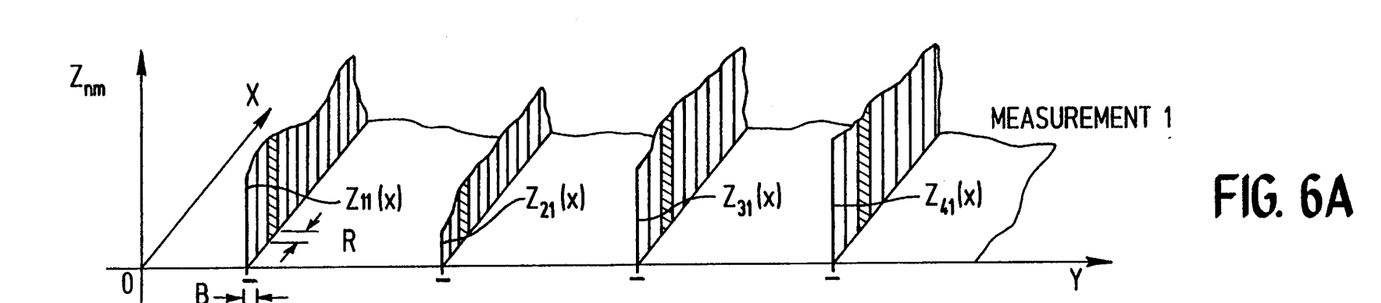
FIG. 6 is a pictorial view of the structure of an image of the radioactivity distribution on the sample plate of a device according to the invention.
Figure 6B:
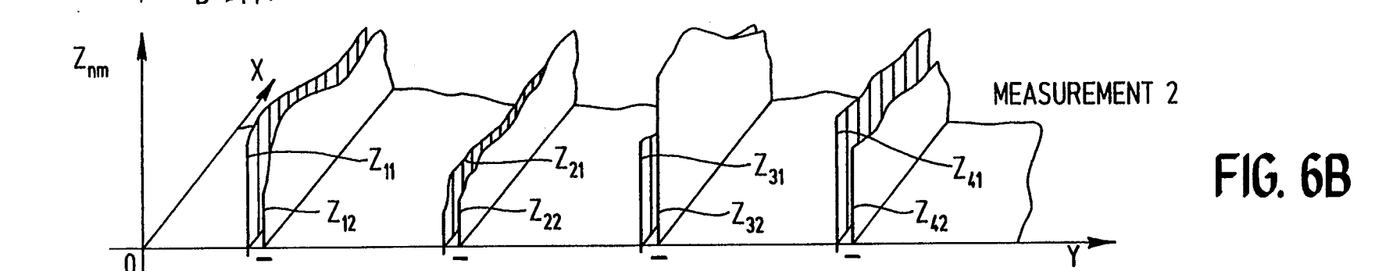
Figure 6C:
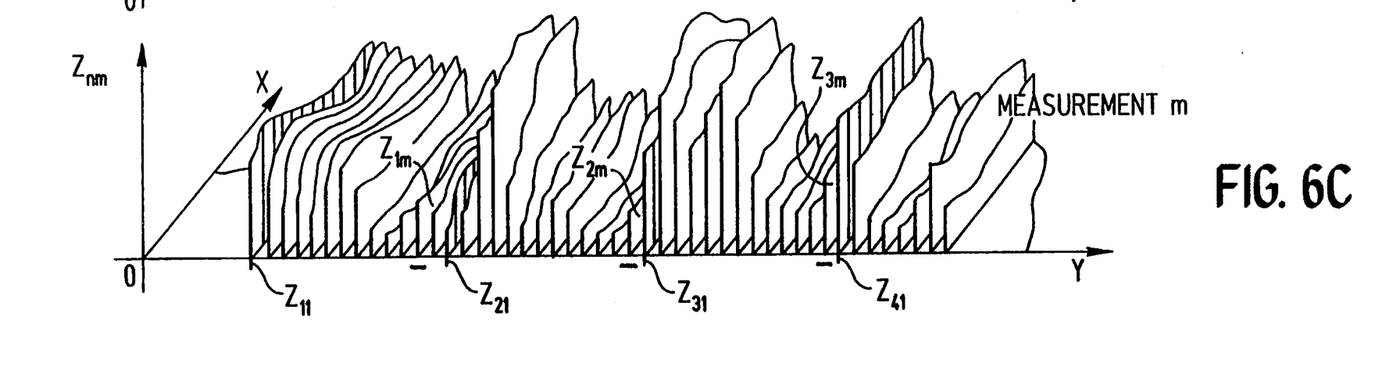

Image construction is then customarily performed in that the counting pulses are added in the adder of the evaluation unit 160 until at the end of a measurement procedure the intensity distribution $Z_{nm}$ is available, as shown in FIG. 6.

When using a two-dimensionally location-sensitive proportional counting tube in the device of the invention, the readout plane $D_x$ (readout wires 132 with delay line 140) perform their known function, i.e. the size and qualitative nature of these components and of the electronic components connected therewith determine the local resolution in the x-direction, which is the direction of the slits 111 of the parallel slit screen 110. It has been shown in actuality that here local resolutions in the range of approximately 2 mm (for example for 32P) are sufficient in connection with the uses stated in the beginning, and such local resolution levels can be achieved without additional components such as collimators or the like.

But in respect to the readout plane $D_y$ with the associated delay line 150 there are a few differences, which will be described in detail with reference to FIG. 2, where the readout plane $D_y$ is disposed below the readout plane $D_x$ in contrast to the illustration of FIG. 1.

Figure 2:
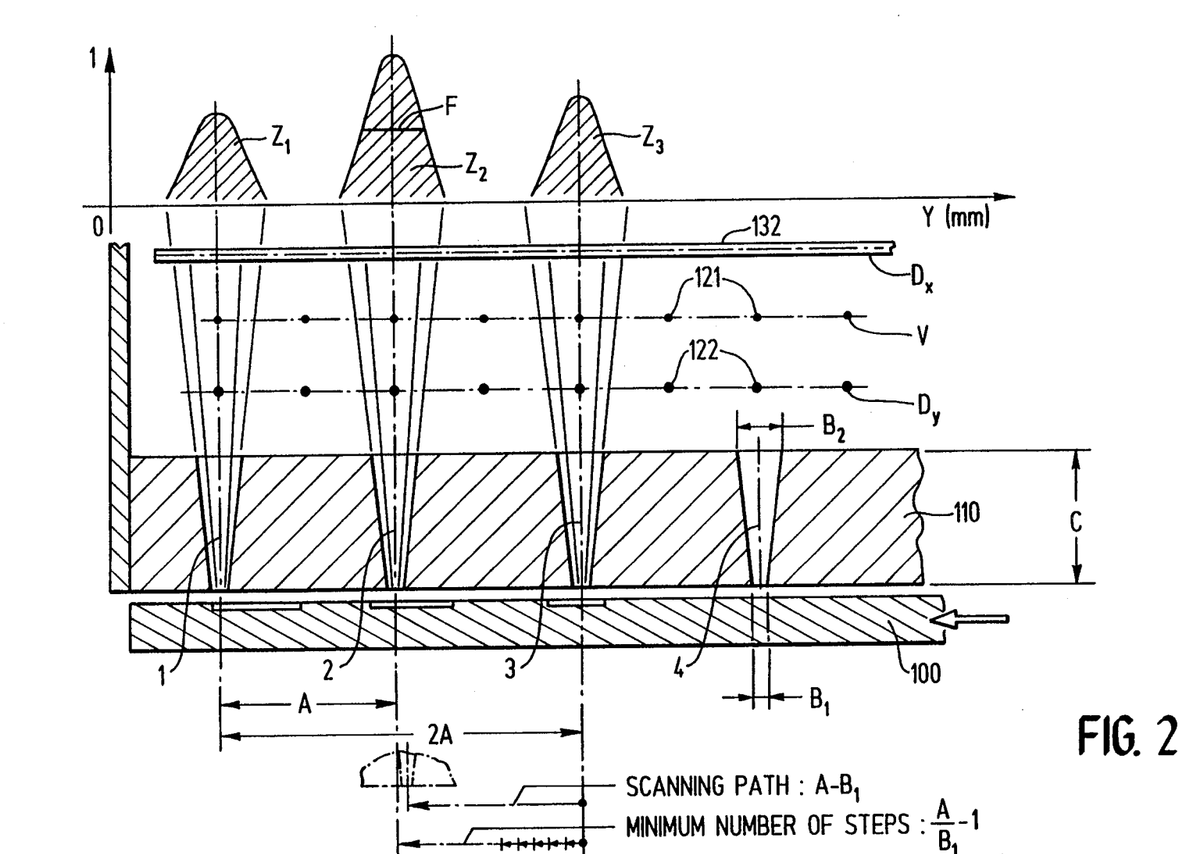
FIG. 2 is a cross-sectional detail view of the device of FIG. 1 in the y-z plane.

FIG. 2 shows that each slit 111, designated by sequential numbers 1, 2, 3, 4 . . . , is assigned to a respective one of the wires 122 of the readout plane $D_y$ as well as to a wire 121 of the anode wire level, or plane, V. Now, since the location resolution in the y-direction is no longer determined by the properties of the components, but by the entrance width $B_1$ of the slits 111, the wires 122 of the readout plane $D_y$ are also no longer used to determine a certain y-position on the sample plate 100, but only to define the slit 111 respectively assigned to it. This means that when this slit information is evaluated by the delay line 150 or by the following electronic evaluation device of the evaluation unit 160, it is possible to define a total of n (corresponding to the number of the slits 111) integration windows in the y-direction, which detect the total radiation which corresponds to a particular partial area of the sample plate 100, having a width $B_1$, located below the slit. Thus all counting pulses which are clearly associated with a slit can be "collected". In this connection, as is shown in FIG. 2, slits 111 are formed such that they widen towards the top in an approximate adaptation to a partial spatial angle to be expected in the radiation emanating from the sample plate 100.

The combination of these two steps together results in pulse rate curves for which three examples are shown at the top of FIG. 2. If the integration windows are selected in the y-direction in such a way that overlap between pulses which are assigned to adjacent slits is impossible, a relatively large portion of the emitted radiation is detected by considering this spatial angle. The entire spectrum shown at the top of FIG. 2 can be associated with a defined slit. This increases the detection sensitivity of the device considerably.

Therefore a resolution of the proportional counting tube also of approximately 2 mm in the y-direction is entirely sufficient because, as already mentioned above, the local resolution in the y-direction is exclusively defined by the width $B_1$ of the slits 111.

With the preferred use of the device of the invention, these limited demands on the inner resolution of the measuring system in the x-direction as well as in the y-direction have the further advantage that the measuring system, i.e. in the exemplary embodiment of FIG. 1 the readout planes $D_x$ and $D_y$, the delay lines 140 and 150 connected with them and the electronic units connected downstream thereof, can be constructed relatively simply, because non-linearities and interfering effects which must be compensated by substantial mechanical and electronic efforts have no or only little importance with respect to resolution. It is therefore possible that mechanical tolerances during construction of, for example, the frames and delay lines, can be larger and that the number of channels of the ADC or TDC "responsible" for the y-direction can be considerably reduced, namely to the number n of the slits 111.

Other tricks for increasing the local resolution in connection with such counting tubes, such as an electronic collimator (DE 30 50 716 C2) or addition of vapor to the counting gas, can also be omitted.

Figure 3:
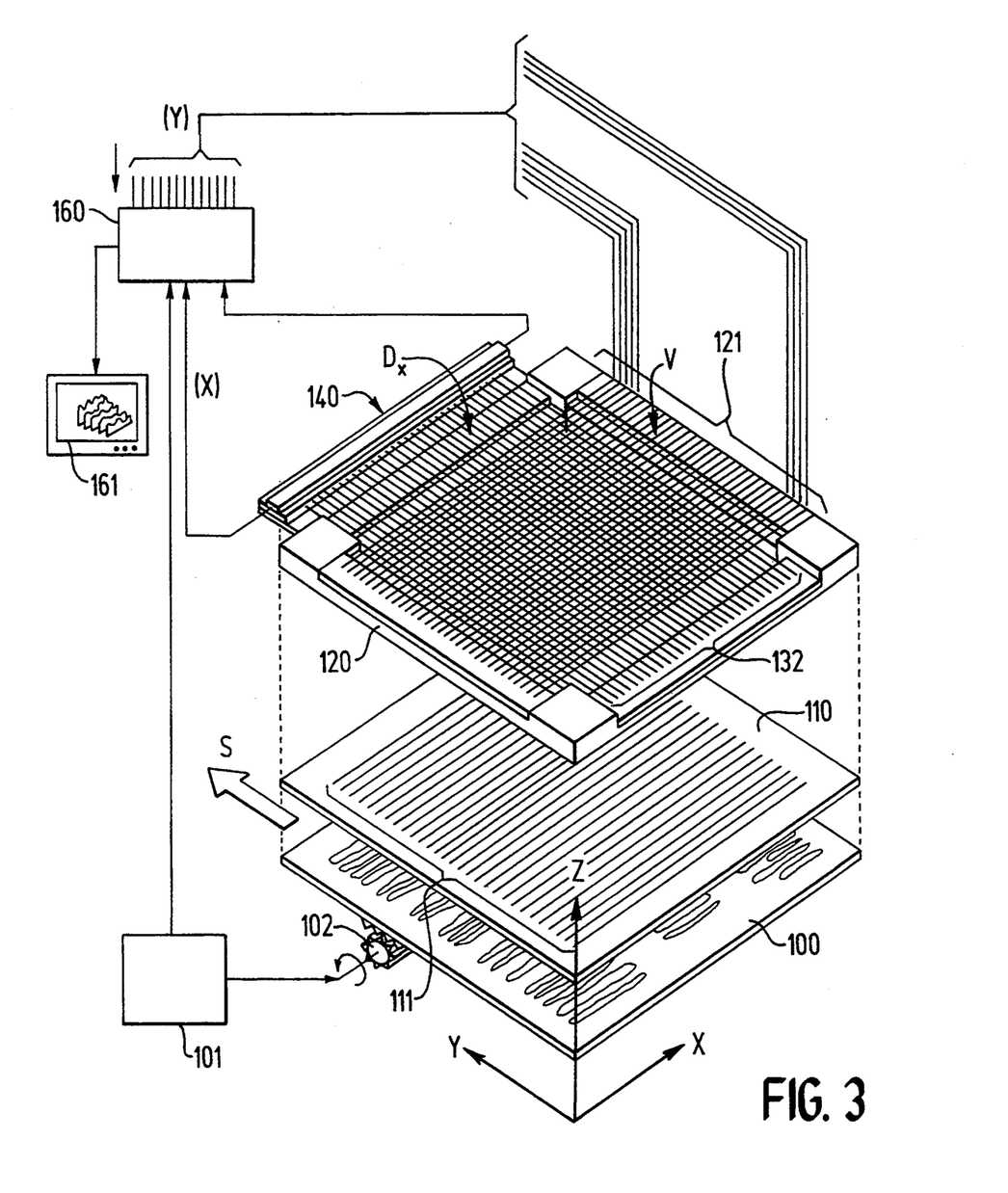
FIG. 3 is an exploded perspective view of a device in accordance with the invention with a location-sensitive two- dimensional proportional counting tube with $D_x$ and anode wire readout.

The above mentioned necessary demands on the local resolution of the measuring system in the y-direction (scanning direction) permit the use of a modified measuring system, such as illustrated in FIG. 3. A parallel stretched counting wire 121 of the anode wire level, or plane, V is assigned to each one of the slits 111, i.e. n anode wires 121 to correspond with the number n of slits 111. The readout wires 132 of the readout plane $D_x$, which are connected with the associated delay line 140 for the location-sensitive measurement of the x-coordinate of each event, extend perpendicularly to wires 121, as in the embodiment of FIG. 1. To the extent that it operates in the x-direction as a location-dependent counting tube and in the y-direction as an n-times counter, this measuring system is a hybrid of a multi-counter and a location-dependent counter. In this variant it is possible to omit the $D_y$ readout plane with the associated delay line, because the signal of the associated anode wires 121 for identifying the slits is directly separated and supplied to the evaluation unit 160, where the corresponding electronic components for evaluating the signal of the delay line 150 of FIG. 1 can, of course, also be omitted.

The direct connection of the anode wire high voltage to the evaluation unit 160 might be disadvantageous in this exemplary embodiment, which as a rule requires additional circuit steps. However, it is seen as an advantage that the measuring system can resolve higher event rates and can operate in a plateau area of the counting tube characteristic in respect to readout, i.e. it is very stable.

Figure 4:
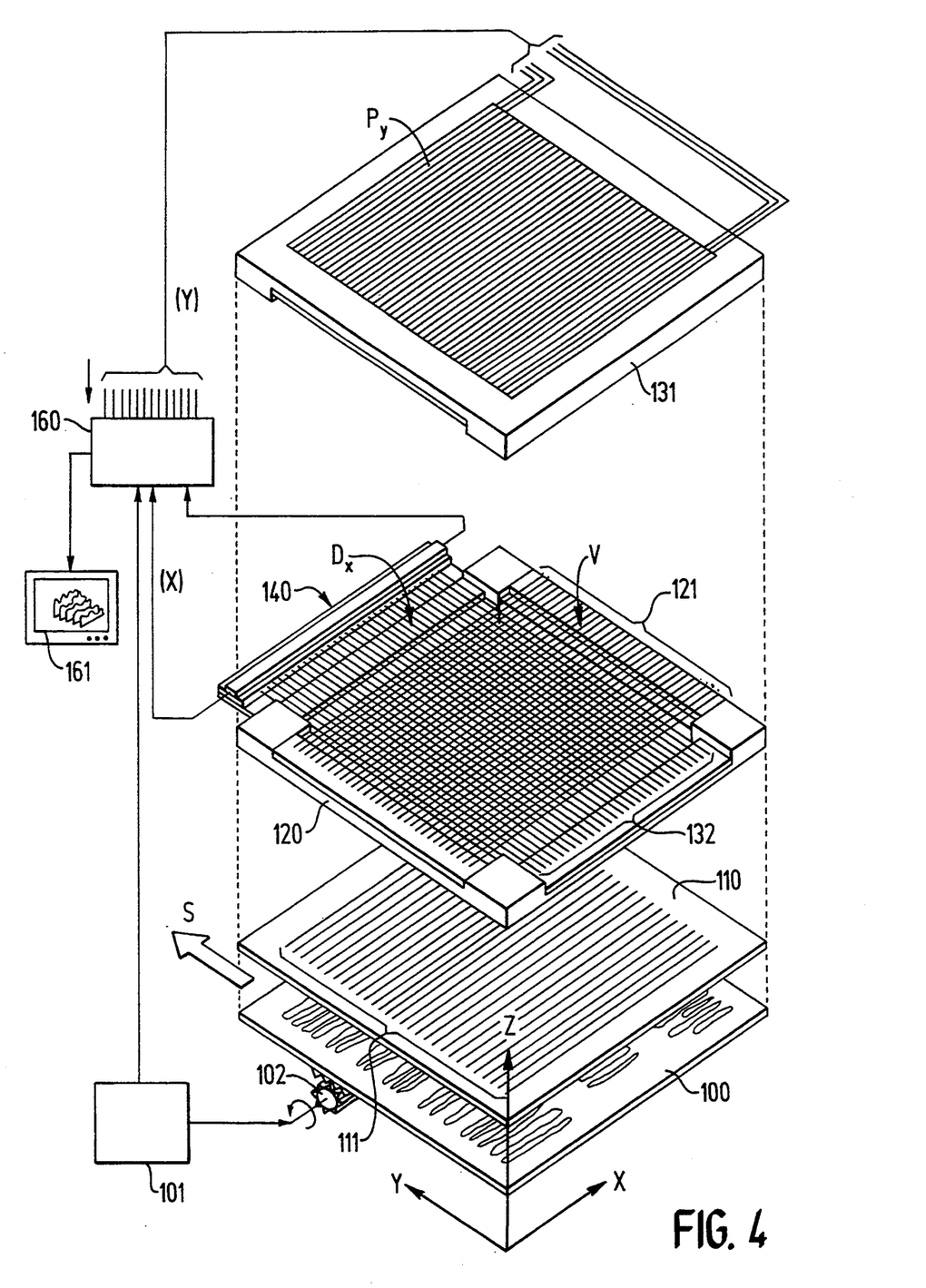
FIG. 4 is an exploded schematic view of a device in accordance with the invention with a location-sensitive two- dimensional proportional counting tube with $D_x$ and pad electrodes as measuring system.
Figure 5:
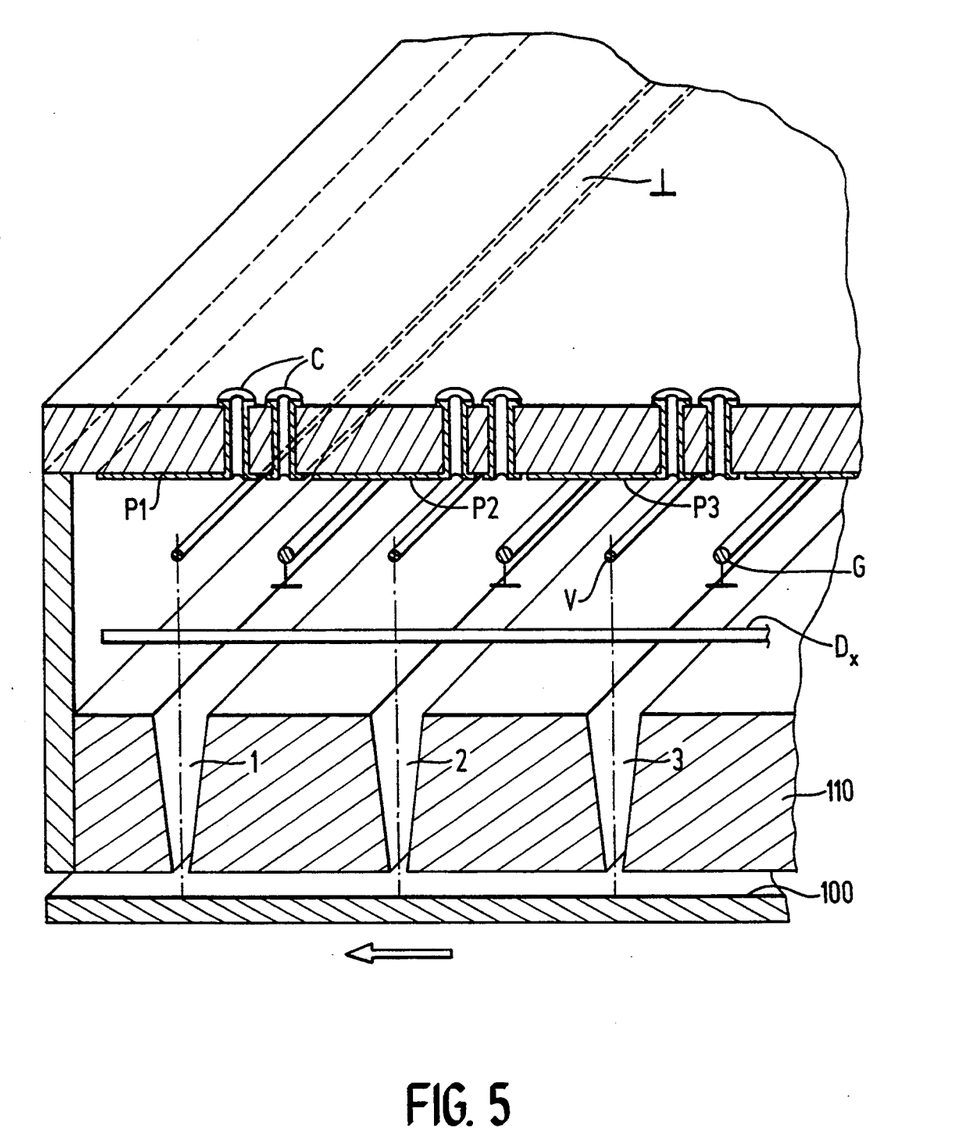
FIG. 5 is a perspective cross-sectional detail view through the structure of a device according to invention in accordance with FIG. 3.

A further embodiment where this advantage is retained while avoiding the difficulties in connection with direct anode wire readout is shown in FIGS. 4 and 5.

A plurality of readout pads P1, P2, P3 . . . , shown in FIG. 5, are each assigned to a respective one (1, 2, 3 . . . ) of slits 111 and together all pads P form a pad plane $P_y$, which is disposed above the readout plane $D_x$. To make the illustration clearer, pad plane $P_y$ is shown on the top of a frame 131 in FIG. 4. But as shown in greater detail and more accurately in FIG. 5, these pads are located on the inside of the counting chamber).

Essentially, each readout pad consists of a metallic, conducting layer, sheet, or coating on the underside of frame 131 facing the sample plate and the anode wires and forming the cathode surface, and an insulated support plate, located above it and oriented towards the rear counting tube wall. This structure can be realized with the aid of printed circuit technology, for example. Contacts C provide conducting connections between the readout pads and the top of the counting tube housing, from where the counting pulses induced in the readout pad are then supplied to appropriate evaluation circuits.

Thus each one of these readout pads has the same function as an anode readout wire 121 of the exemplary embodiment of FIG. 3, namely the identification of the slit with which it is associated. This is accomplished here in that pulses are induced by the anode wires 121 in each readout pad P1 . . . associated with each slit. To avoid cross-talk between readout pads, the individual readout pads P1, P2 . . . are separated from one another by grounded strips (guard strips), which is indicated by the ground symbol in FIG. 5. Each ground strip is also connected to a contact C.

A grid of grounded wires G is located in the anode plane V, with wires G being parallel to the anode wires, also for improving the readout properties.

The readout pads P1 . . . of the pad plane $P_y$ are also individually connected with the evaluation unit 160 and to this extent the measuring system of FIG. 4 represents a hybrid of a multi-counter (pad plane $P_y$) and location-dependent counting tube (readout plane $D_x$ with delay line 140).

A particular advantage of the measuring system with the pad plane $P_y$ lies in that these pads and to a large extent also the associated electronic components such as amplifiers can be embodied with the aid of printed circuit technology, for example as multi-layer printed circuit boards, so that a part of the required electronic circuit can be housed at the counting tube itself or directly on the counting tube housing, if required.

Depending on the purpose and the desired local resolution, one of the systems shown in FIGS. 1 and 2, in FIG. 3, or in FIGS. 4 and 5 can be used as a measuring system. The actual counting tube components (counting chamber and periphery) are not shown for reasons of clarity.

In principle, use of another variant is also possible (not shown for reasons of clarity), where the measuring system is formed of n proportional counters, which are parallel in the x- direction, one-dimensional and location-sensitive, with a delay line and an associated anode wire above each one of the slits of the parallel slit screen 110 in order to perform n locally-sensitive measurements, which operate independently of each other, in the x-direction. This would basically be a parallel arrangement of n proportional counting tubes, such as are shown in DE 30 02 950 C2.

Regardless of the choice of the above described measurements, the basic method in accordance with which the invention operates is identical to that depicted by the signal the diagrams of FIG. 2 and FIG. 6.

Let it be assumed that a first partial measurement is performed with the arrangement in FIG. 2, i.e. the radioactivity of n partial areas of the sample plate 100, each of a width $B_1$, is measured location-dependently in the x-direction. The result of this therefore is the distribution $Z_{nm}$ shown at the top of FIG. 6 and labelled "Measurement 1", n representing the number of the slit and m the number of the measurement. After passage of the time provided for this first partial measurement, the sample plate 100 is moved on by one scanning step by actuating the drive unit 102 (FIG. 1), so that during the second partial measurement the radioactivity distribution of the adjoining partial areas of the sample plate 100 is determined in the course of measuring, which then results in the diagram shown in the center of FIG. 6.

After performing all partial measurements, i.e. following at least $A/B_1 - 1$ scanning steps, where A is the spacing between slits 1, 2, 3, 4 . . . , the sample plate 100 has been completely scanned and a complete histogram has been constructed on the display 161, as illustrated in the diagram in the lower part of FIG. 6.

In practical embodiments of the invention, slit entrance width $B_1$ may have a value of 0.1 to 1 mm, and preferably 0.3 mm, slit exit width $B_2$ may have a value of 0.5 to 3 mm, and preferably 1 to 2 mm, and plate 110 may have a thickness, C, of 1 to 5 mm, and preferably 2 to 3 mm.

On practical example of the practice of the invention is presented as follows:

Thirty-nine partial measurements are conducted with a device having a plate 110 provided with ninety-nine slits 111 with a spacing between the slits of A=4 mm, a slit entrance width $B_1$ of 0.2 mm and a scanning plate sample step width of 0.1 mm.

A grid (number of channels) of 512 steps is provided (R in the top part of FIG. 6) for storing the location information in the x-direction. Thus, each image point (pixel) has an area BxR.

Therefore a total of $99 \times 39 \times 512$ image points are available for showing the radioactivity distribution on the sample plate 100. One evaluation channel of the evaluation unit 160 corresponds to each one of these image points, in which the associated events are registered and added up and a histogram is developed in this way.

Figure 7:
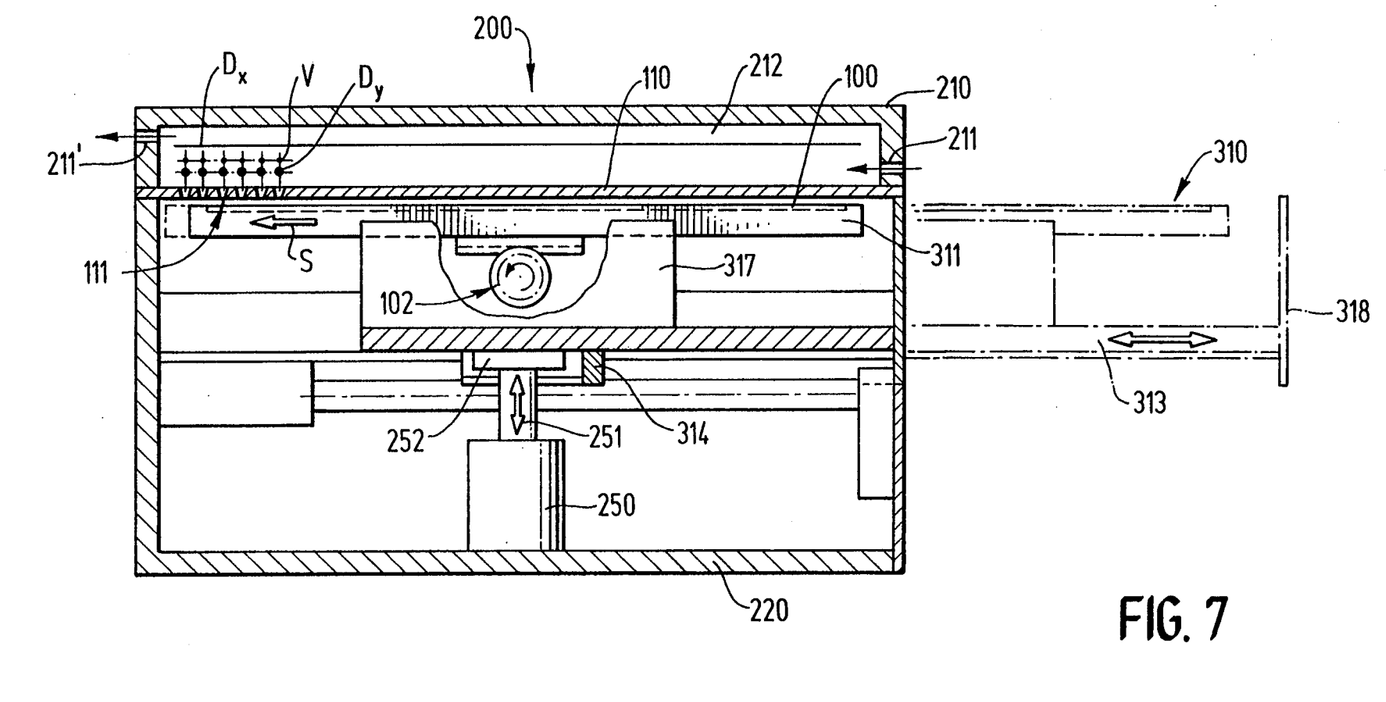
FIG. 7 is a cross-sectional view through the entire apparatus in accordance with FIGS. 1 and 2.

Finally, FIG. 7 shows the complete structure of a device according to the invention, which will be briefly described in summation. Essentially, the structure of the device illustrated in FIG. 7 corresponds to the structure of the device in accordance with DE 37 44 808 C2, so that only the basics will be explained here.

FIG. 7 is a section through an entire measuring system in which the counting chamber described in connection with FIG. 1 and composed of the two frames 120, 130 is housed. These are represented schematically indicated by the readout planes $D_x$ and $D_y$ and the anode wire level V.

The measuring system consists of a housing 200 which is itself made of two parts, namely of an upper part 210 and a lower part 220, where the upper part 210 and the lower part 220 can be connected with each other via a hinge so that they can be flipped or pivoted.

The upper part 210 is used to house the counting chamber 212. The parallel slit screen 110 with the slits 111 partially shown forms the bottom of the counting chamber 212 and of the upper part 210 of housing 200. Fastening and positioning of the frames 120, 130 in the counting chamber can be effected essentially as described in DE 37 44 808 C2.

Gas inlet and outlet openings 211, 211' are used to operate the counting tube as a flow-through counting tube.

While the upper part 210 of the housing 200 is substantially used for housing the counting chamber 212 and, if required, a cap (not shown) for the electronic evaluation unit, the lower part 220 is used for receiving the devices for displacing the sample plate 100 and for exchanging sample plates, as explained below.

Horizontal telescopic rails are fastened on the inner side walls of lower part 220, on the inside of which angle sections are fastened. The horizontal surfaces of the angle sections are used for receiving a base plate 313 which is removably seated on them, the vertical surfaces of the angle sections being simultaneously used for the vertical guidance of the base plate 313.

A motor (not shown) can drive the telescopic rails via a toothed rack drive, so that, therefore, the base plate 313 can be moved horizontally out of the lower part 220, as indicated by chain lines in FIG. 7, through an opening provided in lower part 220.

On the base plate 313 a receiving block 317 for the toothed drive wheel, or pinion, 102 is located, and a support plate 311 is seated on receiving block 317 and is guided horizontally in the scanning direction S. Support plate 311 serves to support a sample plate 100 to be measured.

A front plate 318, which in the inserted state covers the opening in the lower part 220 of the housing 200, is fastened to the front of the base plate 313.

Thus the base plate 313 and the other components described above form an exchange carriage 310 by means of which a sample 100 to be measured can be moved like a drawer from outside of the housing 200 into the area underneath the counting chamber 212.

A pocket-like protrusion 314 is located on the underside of the base plate 313. Protrusion 314 is open at the side thereof which faces away from the insertion opening in lower part 220.

A drive unit 250 with a piston 251 is seated on the bottom of the lower part 220 at a location approximately centered underneath the counting chamber 212. The piston 251 can be displaced, hydraulically, pneumatically, or electrically, upwardly in the direction towards the counting chamber 212. The upper end of the piston 251 is embodied as a stamp-like cap, or a flat-topped plate, 252 which, in the retracted state of the piston 251 is at the same level as the inlet opening of the protrusion 314 below the base plate 313, so that the cap 252 glides into the protrusion 314 when the exchange carriage 310 is slid into housing 200.

As soon as this operating position has been attained, the drive unit 250 can push the piston 251 upwardly until the support plate 311 presses the sample plate 100 to be measured against the underside of the parallel slit screen 110. The first partial measurement can begin in this position. Following the first partial measurement, the piston 251 moves downwardly again and the drive unit 102 (as schematically shown in FIG. 1) displaces the support plate 311 with the sample plate 100 by a distance corresponding to one scanning step in the direction of the arrow S. Then the support plate again moves up and the second partial measurement can be performed. This cycle is repeated until all partial measurements have been performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a device for effecting a location-sensitive measurement of a flat sample of radiation emitting material having a plurality of partial areas, the flat sample lying substantially in a sample plane, which device includes: radiation detector means; a screen plate having radiation passage openings, the screen plate being disposed between the detector means and the flat sample and the radiation passage openings being oriented for directing radiation from the sample to the detector means and the detector means being arranged for detecting radiation emanating from one group of the partial areas in accordance with the shape of the screen plate openings; signal evaluation means for processing and storing information based on radiation detected by the detector means; and means operatively associated with the sample for effecting a relative displacement between the sample and the detector means and for detecting radiation and storing information for another group of partial areas, to produce a total measurement composed of a plurality of successively performed partial measurements which provide a measurement of the total distribution of radiation emitted by the sample, the improvement wherein:

said screen plate has a width and is provided with a plurality of slits which extend in parallel with one another in a first direction substantially parallel to the sample plane, essentially across the entire width of the screen plate, and which constitute said passage openings; and said detector means are operative for effecting a simultaneous, location-sensitive detection of strip-like partial areas of the sample which are in line with the slits;

said means for effecting a relative displacement are operative for causing the relative displacement to occur exclusively in a second direction which is transverse to the first direction and which is substantially parallel to the sample plane;

said device has a desired spatial detection resolution in the second direction;

said signal evaluation means comprise an electronic evaluation unit with a memory device and a display device for displaying measured radiation intensity distribution Z (x, y) of the radiation;

with respect to the first direction, radiation from the sample is detected in a location-sensitive manner;

said slits in said screen plate each have a width dimension, which is in the second direction, with a value that at least approximately corresponds to the desired spatial detection resolution in the second direction; and said means for effecting a relative displacement are operative for producing successive displacements through a distance not greater than the slit width dimension between successive measurements effected by said detector means.

2. A device in accordance with claim 1, wherein said detector means comprise a two-dimensionally location-dependent proportional counting tube having: a first array of wires located in a first plane ($D_x$) which is substantially parallel to the sample plane, said wires of said first array extending in the second direction and being spaced apart from one another in the first direction; a second array of wires located in a second plane ($D_y$) which is parallel to the first plane, said wires of said second array extending in the first direction and being spaced apart from one another in the second direction; a first delay line connected to said first array of wires for providing to said signal evaluation means electrical signals derived from radiation emitted by the flat sample; and a second delay line connected to said second array of wires for providing to said signal evaluation means electrical signals derived from radiation emitted by the flat sample; said first array of wires and said first delay line being operative for effecting a substantially simultaneous, location-sensitive detection of strip-like partial areas of the sample which succeed one another in the first direction and said second array of wires and second delay line being operative for effecting a substantially simultaneous, location-sensitive detection of strip-like partial areas of the sample which are spaced from one another in the second direction.

3. A device in accordance with claim 2, wherein: said electronic evaluation unit comprises a first signal evaluation circuit which defines a plurality of evaluation windows associated with partial areas of the sample which are spaced from one another in the second direction, which partial areas are aligned with said slits and each have a dimension in the second direction which is substantially equal to the width dimension of each said slit; said memory device has a plurality of memory sections, each associated with a respective evaluation window; and said memory device is connected to said first signal evaluation circuit for storing in each said memory section information relating to the radiation emitted from a respective one of the partial areas of the sample which are spaced from one another in the second direction.

4. A device in accordance with claim 2, wherein said slits have a mutual spacing in the second direction, said wires of said second array have a mutual spacing in the second direction which is not greater than the mutual spacing of said slits, and at least some of said wires of said second array are aligned with respective ones of said slits.

5. A device in accordance with claim 1, wherein said detector means comprise a two-dimensionally location-dependent counting tube having: a first array of wires located in a first plane ($D_x$) which is substantially parallel to the sample plane, said wires of said first array extending in the second direction and being spaced apart from one another in the first direction for producing signals in response to radiation from partial areas of the sample which succeed one another in the first direction; and a second array of anode wires located in a second plane (V) which is substantially parallel to the first plane, said anode wires of said second array extending in the first direction and being spaced apart from one another in the second direction so as to each be aligned with a respective slit for producing signals in response to radiation from partial areas of the sample which are spaced apart in the second direction and are aligned with respective ones of said slits.

6. A device in accordance with claim 5, further comprising a plurality of ground wires extending parallel to said anode wires, each said ground wire being interposed between two adjacent anode wires.

7. A device in accordance with claim 1, wherein said detector means comprise a two-dimensionally location-dependent counting tube having: a first array of wires located in a first plane ($D_x$) which is substantially parallel to the sample plane, said wires of said first array extending ill the second direction and being spaced apart from one another in the first direction for producing signals in response to radiation from partial areas of the sample which succeed one another in the first direction; a second array of anode wires located in a second plane (V) which is substantially parallel to the first plane, said anode wires of said second array extending in the first direction and being spaced apart from one another in the second direction so as to each be aligned with a respective slit; and a plurality of cathode strips located in a third plane ($P_y$) substantially parallel to the second plane, each cathode strip being operatively associated with a respective anode wire for producing signals in response to radiation from a respective one of a plurality of partial areas of the sample which are spaced apart in the second direction and are aligned with respective ones of said slits.

8. A device in accordance with claim 7, further comprising a plurality of ground wires extending parallel to said anode wires, each said ground wire being interposed between two adjacent anode wires.

9. A device in accordance with claim 1, wherein said detector means comprise: a plurality of one-dimensionally location-sensitive counting tubes which are parallel to one another and are spaced apart in the first direction; a delay line connected to said counting tubes; and a plurality of anode wires each aligned with a respective one of said slits.

10. A device in accordance with claim 1, wherein each said slit has an inlet edge which faces the flat sample and which has said width dimension, and an outlet edge which faces said detector means and which has a width greater than said width dimension, and each said slit widens progressively from said inlet edge to said outlet edge.

11. A device in accordance with claim 10, wherein each slit has a width which varies in the second direction.

12. A device in accordance with claim 1, wherein each slit has a width which varies in the second direction.

13. A device in accordance with claim 10, wherein said inlet edge of each said slit has a width of 0.1 to 1 mm, said outlet edge of each said slit has a width of 0.5 to 3 mm and said screen plate has a thickness, between said slit inlet and outlet edges, of 1 to 5 mm.

14. A device in accordance with claim 13, wherein said inlet edge of each said slit has a width of 0.3 mm.

15. A device in accordance with claim 13, wherein said outlet edge of each said slit has a width of 1 to 2 mm.

16. A device in accordance with claim 13, wherein said thickness of said screen plate is 2 to 3 mm.

17. A device in accordance with claim 1, further comprising a counting chamber having a lower end, and wherein said detector means and said screen plate form parts of said counting chamber and said screen plate defines said lower end of said counting chamber.

18. A device in accordance with claim 17, wherein said means for effecting a relative displacement comprise a drive unit for pushing the flat sample plate beneath said screen plate.

* * * * *